No. 892,002. PATENTED JUNE 30, 1908.
R. McCARTY & W. S. GIELE.
TOOL STAND.
APPLICATION FILED JULY 17, 1907.
2 SHEETS—SHEET 2.
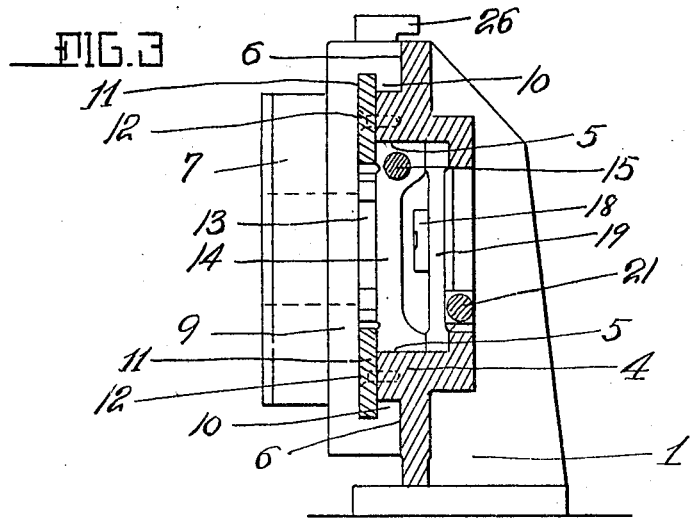
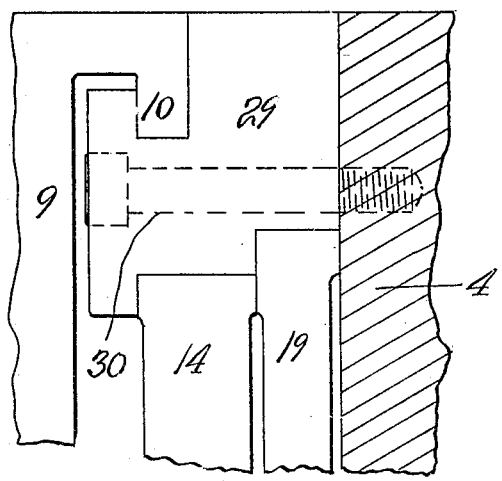
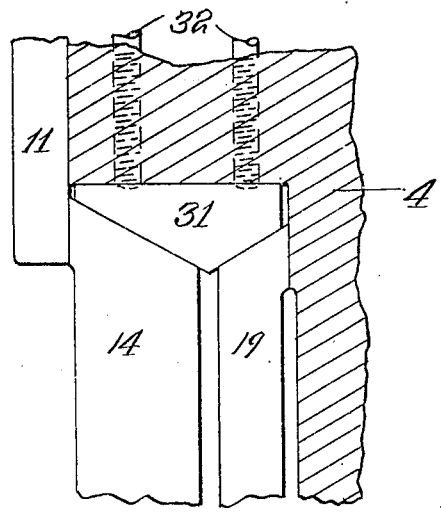
Witnesses:
Edmund O. Duborg.
Geo. A. Hoffman
Ralph McCarty and
Walter S. Giele
Inventors
By their Attorneys
Edwards, Sager & Wooster

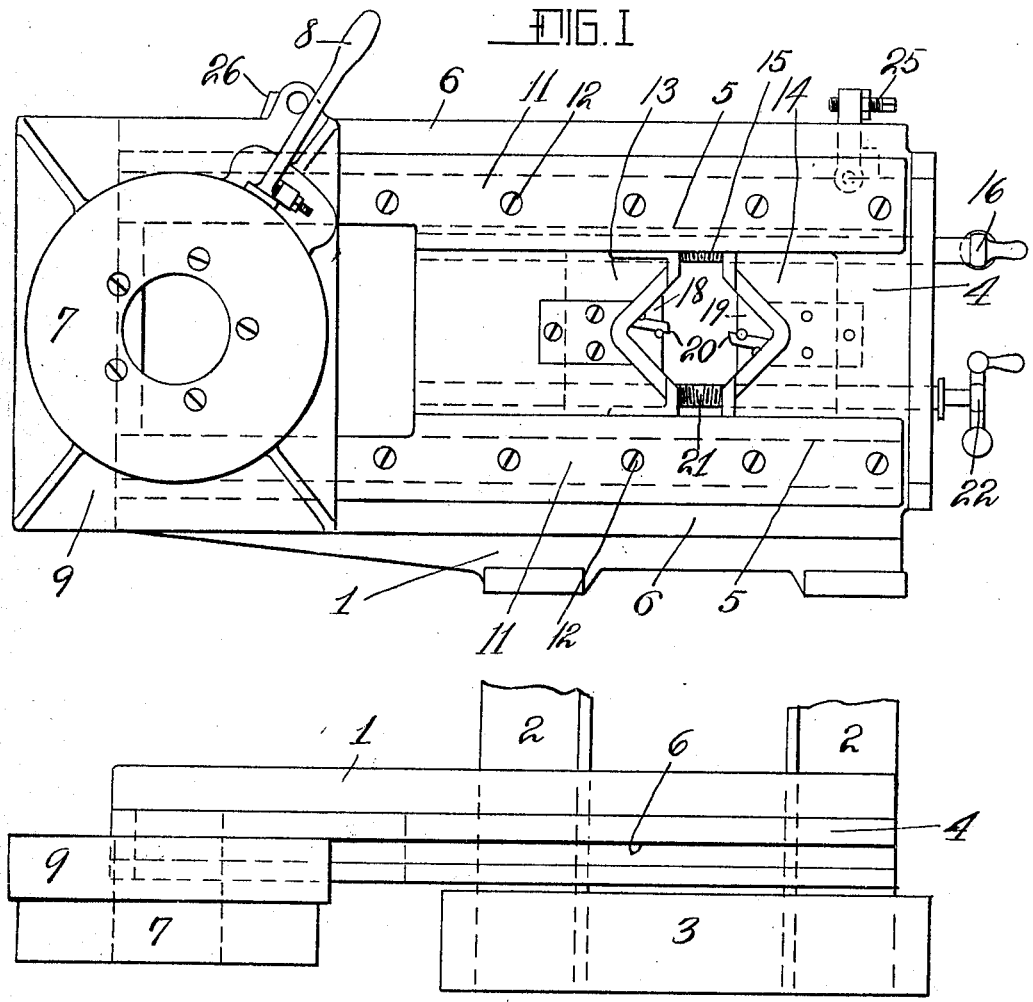

UNITED STATES PATENT OFFICE.

RALPH McCARTY, OF LEBANON, AND WALTER S. GIELE, OF MYERSTOWN, PENNSYLVANIA, ASSIGNORS TO STOEVER FOUNDRY & MANUFACTURING COMPANY, A CORPORATION OF PENNSYLVANIA.

TOOL-STAND.

No. 892,002.      Specification of Letters Patent.      Patented June 30, 1908.

Application filed July 17, 1907. Serial No. 384,238.

*To all whom it may concern:*

Be it known that we, RALPH McCARTY and WALTER S. GIELE, citizens of the United States, residing at Lebanon, in the county of Lebanon and State of Pennsylvania, and at Myerstown, in the county of Lebanon and State of Pennslyvania, respectively, have invented certain new and useful Improvements in Tool-Stands, of which the following is a full, clear, and exact specification.

This invention relates to tool stands, and more particularly has reference to the stands or supports for threading dies and cutting-off tools used in threading machines for rods or pipes. Such machines commonly employ a rotating chuck for rotating the rod or pipe with a fixed die-head, support and cutting-off tool arranged to be brought into position to work on the material.

The object of this invention is to provide an improved construction and arrangement of the tool-stand on which the dies and cutters are mounted whereby the cutters and steadying jaws may be brought closer to the chuck than has been possible in the constructions heretofore devised. In machines of this character, as the length of rod or pipe decreases, the tool-stand is moved toward the chuck as far as it is possible, and when it can move no farther, there is a length of material between the jaws of the chuck and the cut-off tool which cannot be cut off.

According to this invention, a tool-stand is provided wherein the die-head is laterally slidable to an extent sufficient to clear the chuck when the tool-stand is moved up against the chuck, and mounted in the tool-stand are steadying jaws for supporting the work between the cut-off tool and the chuck arranged in such manner as to leave the shortest possible length of material between the chuck and the cut-off tool which cannot be further worked.

The invention with respect to a preferred form thereof is shown in the accompanying drawings, wherein Figure 1 is a front view of a tool-stand embodying the invention; Fig. 2 is a plan view, showing the tool-stand at its innermost position against the chuck; Fig. 3 is a vertical section through the center of the tool-stand, and Figs. 4 and 5 show modified constructions of the tool-stand with provisions for taking up wear.

1 represents a casting which will be mounted to slide on ways 2 carried by a suitable machine bed having a power driven chuck 3. The tool-stand comprises the transverse upright portion 4 of the casting 1 having a groove or guide-way 5 machined therein, and also the die-head guiding surfaces 6, which are outside the interior guides 5.

7 is the die-head carrying therein suitable expansible dies controlled by a lever 8, and mounted on a block 9, which block is formed with inwardly projecting portions 10 sliding on the surfaces 6 of the upright portion 4 of the casting 1. In order to fasten the die-head to the stand, transverse bars 11 are provided which are secured to the front faces of the stand by screws 12, and over which the block 9 will slide transversely.

Mounted within the stand to slide on the surfaces 5 are oppositely disposed blocks 13, 14 having cut-out portions to bear on the surface of the round material, and constituting steadying jaws. These steadying jaws are simultaneously operable towards and from each other by means of a right and left hand screw 15 journaled at the ends in the stand and having screw threaded engagement with the jaws 13 and 14. For operating the jaws a crank 16 is mounted on the screw 15. It will be observed that the jaws 13 and 14 overlap, that is, that they pass each other, which is for the purpose of enabling them to be adjusted for different sizes of material, though it will be understood that this arrangement is not essential. Also mounted to slide in the upright portion of the stand 4, are oppositely disposed blocks 18, 19 carrying cut-off tools 20, and operated in a manner somewhat similar to the jaws 13, 14 by screws 21 and crank 22. It will thus be seen that the bars 11 besides fastening the sliding die-head to the stand, will also hold the steadying jaws and the cut-off tool blocks in their respective positions.

25 is an adjustable stop carried by the casting and coöperating with a lug 26 carried by the die-head for stopping it in threading position.

It will be seen that the thickness of the die-head 7 and the block on which it is mounted is negligible, when it is desired to cut off the material as close as possible to the chuck, because the die-head and block on which it is mounted can be slid laterally as shown in Fig. 2, so as to clear the chuck, and thus not interfere with bringing the front face of the stand up close against the chuck. There is, however, a certain amount of thickness or length necessary for the guiding portions 10 of the die-head, and also there is a certain amount of additional thickness or length necessary for the mounting of the steadying jaws and the cut-off tool blocks. In order to reduce the distance from the jaws of the chuck to the cut-off tools, the latter must be mounted as near as possible to the front face of the tool-stand, and at the same time leaving space in which the steadying jaws may be mounted and operated. This result is attained by the construction herein described by mounting the die-head slide on the outside of the tool-stand casting, and thus permitting the steadying jaws and the cut-off tool blocks to be mounted within and close to the front of the die-stand. In Fig. 3 for instance, the left-hand steadying jaw comes flush with the front face of the retaining bar 11, and the right-hand jaw 14 is immediately behind the jaw 13, and immediately behind the jaws 13 and 14 and contacting with them are the cut-off tool blocks 18, 19, and all of these parts are held in assembled relation by the bars 11. The amount of stock which cannot be cut off is thus only slightly greater than the thickness of the steadying jaws, when the front face of the tool-stand is brought up close to the face of the chuck. This distance is reduced by this construction upwards of fifty per cent., as compared with constructions wherein the steadying jaws and cut-off tool blocks are mounted at the rear of the die-head slide.

A further advantage of this invention resides in the fact that the casting 4 need only be set once in a shaping machine, and all of the machined surfaces can be formed without changing its position, or requiring it to be turned over, thus reducing the cost of manufacture.

In the construction thus far described, wear may be taken up by means of shims, where desired, but in some constructions it is desirable to provide means for taking up the wear of the slides on each other and on the casting, and the constructions of Figs. 4 and 5 are intended for this purpose. In Fig. 4, the casting 4 is provided with a flat front face, and the slides 13 and 14, and 19, 20, are secured thereto by means of top and bottom bars 29 and screws 30, similar in function to the bars 11 and screws 12 before described. The bars 29 are provided with grooves in which the die-head slide 9 operates in the same manner as before described. It will be observed that the blocks 29 have separate guiding surfaces for the blocks 13, 14 and 18, 19 respectively, and wear will be taken up by removing shims from between fitted surfaces as before described. In Fig. 5, the slides 13, 14 and 18, 19 are beveled on the upper faces, and a key 31 inserted which can be adjusted by screws 32 tapped through from the top of the casting 4. As the slides wear, the key 31 may be screwed down by the screws to spread the slides against the rear side of the casting and of the bars 11.

From the foregoing description, it is thought that the construction, operation and advantages of the invention will be fully understood, and the specific construction herein described may be departed from in various particulars without departing from the scope of the invention.

Having thus described our invention, we declare that what we claim as new and desire to secure by Letters Patent, is,—

1. The combination with a support and a die-head slide slidably mounted thereon, of steadying jaw slides mounted to slide on said support between the guides for the die-head slide.

2. The combination with a support having exterior guides, of a die-head slide mounted in said guides, and interior steadying jaw guides and steadying jaws sliding therein.

3. The combination with a support having a projecting portion formed with exterior guides at opposite sides, of a die-head slide mounted on said guides, interior guides between said exterior guides, and a pair of slides sliding between said interior guides.

4. The combination with a support having a projecting portion formed with exterior guides at opposite sides, of a die-head slide mounted on said guides, interior guides between said exterior guides, a plurality of sets of slides mounted side by side in said support between said interior guides, and means for independently actuating each set.

5. The combination with a support formed with a projecting portion having exterior guides at opposite sides, of a die-head slide mounted on said guides to slide in front of said projecting portion, interior guides formed in said support between said exterior guides, and work-steadying and cut-off tool slides carried by said support and between said interior guides.

6. The combination with a support having interior and exterior guides, of a die-head slide mounted on the exterior guides, and cut-off tool slides mounted to slide on the interior guides, and a single means carried by the support for securing both the die-head slide and the cut-off tool slides in the support.

7. The combination with a support having interior and exterior guiding surfaces, of a die-head slide mounted to slide on the exterior guide surfaces, interior slides mounted to slide on the interior guide surfaces, and a single means carried by the support for securing and guiding the exterior slide and the interior slides.

8. The combination with a support having transversely extending exterior and interior guiding surfaces, of a transversely movable die-head slide mounted to move on said exterior surfaces, steadying-jaw slides and cut-off tool slides moving on said interior guiding surfaces, and a pair of retaining bars secured to said support between said exterior and interior guiding surfaces for retaining said slides on said support.

9. The combination with a support formed with oppositely disposed exterior slides, and a die-head sliding thereon, of a plurality of pairs of slides mounted on common interior guides formed in said support between said exterior guides.

10. The combination with a support, formed with oppositely disposed exterior slides, and a die-head sliding thereon, of a plurality of pairs of slides mounted on common interior guides formed in said support between said exterior guides, and a single means carried by the support for retaining said die-head and said interior slides on said support.

11. The combination with a support formed with oppositely disposed exterior slides, and a die-head sliding thereon, of a plurality of pairs of slides mounted on common interior guides formed in said support between said exterior guides, and a single means for retaining said die-head and said interior slides on said support and having guiding surfaces coöperating with said die-head and with one of said pairs of interior slides.

12. The combination with a support and a die-head slide slidably mounted thereon, of cut off slides mounted to slide on said support between the guides for the die-head slide.

13. The combination with a support and a die-head slide slidably mounted thereon to slide over its front face, of steadying jaw slides mounted to slide between said die-head slides and flush with the front face of said support.

In testimony whereof we affix our signatures, in presence of two witnesses.

RALPH McCARTY.
WALTER S. GIELE.

Witnesses:
 WM. ROBINSON,
 HATTIE S. COOVER.